(12) United States Patent
Murao et al.

(10) Patent No.: US 7,433,154 B2
(45) Date of Patent: Oct. 7, 2008

(54) CLEANING TAPE FOR CLEANING A MAGNETIC HEAD

(75) Inventors: Naoto Murao, Kanagawa (JP); Tomohiro Ichikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 427 days.

(21) Appl. No.: 11/217,367

(22) Filed: Sep. 2, 2005

(65) Prior Publication Data

US 2006/0066997 A1 Mar. 30, 2006

(30) Foreign Application Priority Data

Sep. 30, 2004 (JP) ............ P.2004-288215

(51) Int. Cl.
*G11B 5/41* (2006.01)
(52) U.S. Cl. .................................... 360/128
(58) Field of Classification Search ............... 360/128, 360/134; 428/148, 354
See application file for complete search history.

(56) References Cited

U.S. PATENT DOCUMENTS 6,124,030 A * 9/2000 Suzuki et al. ............ 428/328
6,821,189 B1 * 11/2004 Coad et al. .................. 451/41
6,916,521 B2 * 7/2005 Ishiguro et al. ............ 428/141
2002/0086183 A1 7/2002 Misawa
2002/0106497 A1 8/2002 Ishiguro et al.

FOREIGN PATENT DOCUMENTS

| EP | 1 271 521 A2 | 1/2003 |
|---|---|---|
| JP | 06-139531 A | 5/1994 |
| JP | 2002-230727 A | 8/2002 |
| JP | 2003-281706 A | 10/2003 |
| JP | 2004-095182 A | 3/2004 |

OTHER PUBLICATIONS

Patent Abstracts of Japan (JP-A-8-315327), Sagawa Hiroyuki, "Cleaning Tape".
European Search Report dated Jan. 20, 2006.

* cited by examiner

*Primary Examiner*—Jefferson Evans
(74) *Attorney, Agent, or Firm*—Sughrue Mion, PLLC

(57) ABSTRACT

A cleaning tape comprising a support and a coating layer containing powder and a binder, wherein a surface of the coating layer has a central line average roughness of from 5 to 25 nm and has protrusions having height of 25 nm or more in number of from 60 to $1,700/10^5$ μm², the surface of the coating layer being a surface of the cleaning tape.

8 Claims, No Drawings

CLEANING TAPE FOR CLEANING A MAGNETIC HEAD

FIELD OF THE INVENTION

The present invention relates to a cleaning tape for a magnetic head. More specifically, the invention relates to a cleaning tape for cleaning a magneto-resistance (MR) head used in a magnetic recording and reproducing apparatus for a computer.

BACKGROUND OF THE INVENTION

Recording and reproducing of magnetic recording apparatus for video recorder and computer are generally performed by sliding a magnetic head and a magnetic tape in contact each other. At this time, if the shavings of the magnetic tape and the dusts on the periphery of the recording apparatus are adhered to the surface of the magnetic head, reproduction output lowers and output cannot be obtained at all in the end. For recovering the reproduction output lowered in such a way, a cleaning tape restoring the reproduction output by cleaning the dirt adhered on the surface of the magnetic head is used (e.g., refer to JP-A-6-139531, JP-A-2003-281706, JP-A-2004-95182 and JP-A-2002-230727).

On the other hand, magnetic recording becomes more and more higher density, and so it is difficult to accomplish satisfactory recording and reproduction if the tip of a magnetic head and a magnetic tape are not in contact well with each other. For maintaining good head touch, a cleaning tape is required not only to clean a magnetic head of dirt but also to adjust the form of the head to a certain degree. In particular, a magnetic head for high density recording of the shortest recording wavelength of 1 μm or less is used in recent years, therefore a trace of dirt on the head will interfere with recording and reproducing performance.

With the progress of the increase of recording density, the materials of magnetic head have been changing from the former ferrite to hard metal such as Sendust, and further in recent years to a magneto-resistance effect type (MR) element using Permalloy low in hardness as the material. Further, a pointed head tip as used in helical scan has been conventionally used, but in the case of a linear tape, a flat head that touches the whole breadth of a tape is coming to be used. The head comprises highly hard ceramics having minute depression of a depth of several ten nanometers or so, and an MR element is inserted in the depression.

For uniformly and efficiently cleaning such an MR head for use in high density magnetic recording, it is required that a cleaning tape uniformly touches the tape sliding surface of an MR head, the surface of the MR element inserted in the minute depression must be cleaned, and a cleaning tape has appropriate abrading force so as not to abrade the soft MR element.

As cleaning tapes of LTO system, unused data-recording tapes have been conventionally diverted, but the surfaces of data-recording tapes are too smooth, so that cleaning operation must be repeated several times to remove persistent dirt, and it has been difficult to remove the dirt on the surface of an MR element. Further, since the tape irregularly touches the sliding surface of a flat head, cleaning results in unevenness.

SUMMARY OF THE INVENTION

An object of the invention is to provide a cleaning tape having sufficient cleaning power and at the same time capable of controlling the abrasion of head, and especially suitable for the cleaning of a magneto-resistance (MR) head of a high density magnetic recording reproducing apparatus.

The object of the invention can be achieved by the following means.

1) A cleaning tape comprising a support having thereon a coating layer containing powder and a binder provided on at least one side of the support, wherein the central line average roughness (Ra) of the coating layer is from 5 to 25 nm, and protrusions having a height of 25 nm or more are present on the surface of the coating layer in number of from 60 to $1,700/10^5$ μm$^2$. The cleaning, tape can be used as a tape for cleaning by making the coating layer in contact with a magnetic head.

2) The cleaning tape as described in the above item 1), wherein the coating layer comprises a nonmagnetic layer provided on the support and a magnetic layer provided on the nonmagnetic layer.

The invention can provide a cleaning tape having sufficient cleaning power and at the same time capable of controlling the abrasion of head, and especially suitable for the cleaning of an MR head by prescribing the surface roughness and the number of protrusions of the coating layer of the cleaning tape. That is, by the surface roughness and the number of protrusions of the coating layer prescribed in the invention, the dirt on the surface of highly hard ceramics constituting an MR head can be efficiently removed and at the same time the dirt on the surface of an MR element inserted in minute depression can also be efficiently removed. At this time, the cleaning tape surface is kept in contact with the surface of the ceramics at all times but the MR element is brought into contact with protrusions intermittently, the abrasion of the MR element can be prevented.

Further, by providing as the coating layer a nonmagnetic layer on a support and a magnetic layer on the nonmagnetic layer, cleaning effect of the cleaning tape of the invention can be heightened. By making a magnetic layer of the upper layer, recording of data can be performed at the same time, if necessary.

DETAILED DESCRIPTION OF THE INVENTION

The invention is described further specifically.

A cleaning tape in the invention is provided with a coating layer containing powder and a binder on at least one side of a support. It is necessary that the central line average roughness (Ra) of the coating layer be from 5 to 25 nm, preferably from 10 to 20 nm, and more preferably from 12 to 18 nm. When Ra is smaller than 5 nm, sufficient cleaning effect cannot be obtained, while when it exceeds 25 nm, there arises a drawback that head abrasion increases.

Further, it is necessary that protrusions having a height of 25 nm or higher be present from 60 to $1,700/10^5$ μm$^2$ on the surface of the cleaning tape of the invention, preferably from 100 to $1,600/10^5$ μm$^2$, and more preferably from 500 to $1,500/10^5$ μm$^2$. When protrusions having a height of 25 nm or higher are less than $60/10^5$ μm$^2$, sufficient cleaning effect cannot be obtained, while when protrusions exceed $1,700/10^5$ μm$^2$, there arise drawbacks that unbalanced abrasion occurs or head abrasion increases.

In the invention, Ra means a value to be measured with a photo-interference surface roughness meter (NV-5000, manufactured by ZYGO) on the following conditions:

Ra is computed with an objective lens of 20 magnifications, an intermediate lens of 1.0 magnification, measuring range of 345 μm×257 μm, and after cylindrical compensation and gradient inclination compensation.

In the invention, the density of protrusions on the coating layer surface is a value obtained by counting the number of protrusions higher than a reference plane by 25 nm or more taking a plane where the volumes of the protrusions and cavities measured with the photo-interference surface roughness meter are equal as the reference plane.

Various methods can be used for controlling Ra and protrusions in the prescribed range of the invention. For instance, to select the roughness of a support, to increase or decrease the amount of filler added to a support, and to select the calender treatment conditions are exemplified. When Ra and protrusions are controlled by the calender treatment conditions, there are means of arbitrarily changing the linear pressure of surface forming treatment and the surface state of calender rollers. The degree of surface roughness (Ra) of the cleaning tape may be the same or different on the obverse and reverse.

The cleaning tape of the invention is preferably used in the cleaning of a magnetic head using an MR element for reproduction. In particular, the cleaning tape of the invention exhibits preferred effect for an MR head comprising ceramics such as $Al_2O_3/TiC$ having minute depression of a depth of from 10 to 50 nm and an MR element is inserted in the depression.

The recording wavelength of signals performing recording and reproducing with an MR head is 1 µm or less in the point of high density recording, preferably from 0.2 to 0.7 µm, and more preferably from 0.2 to 0.5 µm. The cleaning tape in the invention is preferably used in a magnetic recording and reproducing apparatus having a recording track width of 30 µm or less, preferably from 1 to 20 µm, and the difference between a recording track width and a reproducing track width of from 0 to 16 µm, preferably from 0 to 10 µm. The reason is that when recording wavelength and track widths are in the above ranges, spacing loss due to the soil of head is great.

The constitution of the cleaning tape in the invention is described in further detail below. Further, the case where the cleaning tape of the invention is used for MR heads is described.

Cleaning Tape:

A coating layer provided on a support of a cleaning tape mainly uses powders such as fine grain inorganic powders dispersed in a binder. The fine grain inorganic powders may be nonmagnetic or magnetic grains. The coating layer consists of a single layer or a plurality of layers. The coating layer is formed on the side that is brought into contact with an MR head.

The object of providing the coating layer is to impart functions that a support does not have, according to necessity, to the cleaning tape, for example, to provide a cleaning effect by containing nonmagnetic abrasive grains on the side that is in contact with an MR head, to provide an antistatic effect by containing electrically conductive grains, to provide a recording property of magnetic signal by containing magnetic grains, etc., are exemplified.

The coating layer can control a friction coefficient by containing a lubricant. As preferred recording layers, a single layer of a magnetic layer similar to a data recording tape or a nonmagnetic tape, and a two-layer constitution comprising a nonmagnetic layer (a lower layer) and a magnetic layer (an upper layer) on the nonmagnetic layer provided on the side that is in contact with an MR head, and a back coat layer (a backing layer) mainly comprising carbon black provided on the opposite side are exemplified.

The total thickness of the cleaning tape is preferably from 5 to 30 µm, more preferably from 8 to 20 µm.

The thickness of a coating layer is preferably from 0.1 to 5.0 µm as a single layer or the total of a plurality of layers, more preferably from 0.5 to 3.0 µm. The thickness of a support is preferably from 3 to 25 µm, more preferably from 6 to 20 µm. When the coating layer takes the constitution comprising a nonmagnetic layer and a magnetic layer provided on the nonmagnetic layer, the thickness of the nonmagnetic layer is from 0.5 to 4.5 µm, preferably from 0.5 to 2.5 µm, and the thickness of the magnetic layer is from 0.03 to 0.2 µm, preferably from 0.05 to 0.15 µm, and more preferably from 0.05 to 0.10 µm.

Cupping of the cleaning tape is preferably from 0 to 1 mm per ½ inch width, more preferably from 0 to 0.6 mm. The head touch in the width direction becomes more uniform by this value.

Cupping is a value measured as follows.

A 1 m long tape is cut out and held in a measuring environment (23° C., 50% RH) for 24 hours. A central part in the machine direction is cut out in length of 300 mm, and the tape is allowed to stand on a flat plate with the coating layer looking up (in the case of providing a magnetic layer, the magnetic layer is upside) for 3 hours. After that, a tape width (W2) of 100 mm long at the central part of the 300 mm is measured with a comparator. Further, a tape width (W1) of the same sample of the time being covered with a slide glass is measured.

Cupping is a value obtained according to the following approximate equation.

$$\text{Cupping} = (W2/2)\tan(S^{1/2})$$

wherein $S = 10 \times [1 - (1.2W2/W1 - 0.2)^{1/2}]$

The surface electric resistance of the cleaning tape is preferably $10^{10}$ Ω/sq or less, more preferably $10^9$ Ω/sq or less. This range of surface electric resistance can prevent electrification of the cleaning tape, so that an MR head can be prevented from being damaged by static electricity.

As a means of adjusting surface electric resistance to a prescribed range, the addition of electrically conductive powder such as carbon black to at least one layer of, e.g., a lower layer, an upper layer and a backing layer is exemplified. For example, carbon black is added in an amount of from 1 to 20 weight parts per 100 weight parts of the binder in each layer.

As the cleaning tape, a magnetic tape comprising nonmagnetic lower layer containing nonmagnetic inorganic powder and a binder, an upper magnetic layer containing ferromagnetic powder and a binder, and a backing layer provided on the opposite side to these layers is preferred.

A cleaning tape comprising the above magnetic tape is descried in detail below.

Magnetic Layer:

<Binders of a Magnetic Layer and a Nonmagnetic Layer>

Well-known thermoplastic resins, thermosetting resins, reactive resins and mixtures of these resins are used as the binders in a magnetic layer and a nonmagnetic layer. As thermoplastic resins, resins having a glass transition temperature of from 100 to 150° C., a number average molecular weight of from 1,000 to 200,000, preferably from 10,000 to 100,000, and the degree of polymerization of about 50 to 1,000 or so are used.

As the examples of such thermoplastic resins, polymers and copolymers containing as the constituent vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal or vinyl ether, polyurethane resins and various rubber resins are exemplified. As the examples of thermosetting resins and reactive resins, phenolic resins, epoxy resins, polyurethane curable type resins, urea resins, melamine resins, alkyd resins, acrylic reactive resins, formaldehyde resins, silicone resins, epoxy-polyamide resins, mixtures of polyester resins and isocyanate prepolymers, mixtures of polyester polyol and polyisocyanate, and mixtures of polyurethane and polyisocyanate are exemplified. These resins are described in detail in *Plastic Handbook*, Asakura Shoten. It is also possible to use well-known electron beam-curable resins in each layer. The examples of these resins and manufacturing methods are disclosed in detail in JP-A-62-256219.

These resins can be used alone or in combination, and it is preferred in the invention to use combinations of at least one resin selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with a polyurethane resin and polyisocyanate.

Polyurethane resins having well known structures, e.g., polyester polyurethane, polyether polyurethane, polyether polyester polyurethane, polycarbonate polyurethane, polyester polycarbonate polyurethane and polycaprolactone polyurethane can be used. For the purpose of obtaining further excellent dispersibility and durability with respect to all the binders described above, it is preferred to use at least one polar group selected from the following and introduced by copolymerization or addition reaction according to necessity, e.g., COOM, $SO_3M$, $OSO_3M$, $P=O(OM)_2$, $O-P=O(OM)_2$ (wherein M represents a hydrogen atom or an alkali metal salt group), OH, $N(R)_2$, $N^+(R)_3$ (wherein R represents a hydrocarbon group), an epoxy group, SH and CN. The content of these polar groups is from $10^{-1}$ to $10^{-8}$ mol/g, preferably from $10^{-2}$ to $10^{-6}$ mol/g.

The content of hydroxyl groups in polyurethane resins is preferably from 3 to 20 groups per a molecule, and more preferably from 4 to 5 groups per a molecule. When the content of hydroxyl groups is less than 3 per a molecule, the reactivity with a polyisocyanate curing agent lowers, as a result the film strength and durability are liable to decrease. While when the content is more than 20 groups, the solubility in a solvent and dispersibility are liable to lower. For adjusting the hydroxyl group content in a polyurethane resin, compounds having trifunctional or higher hydroxyl groups can be used in the synthesis of the polyurethane resin. The specific examples of the compounds having trifunctional or higher hydroxyl groups include trimethylylethane, trimethylol-propane, trimellitic anhydride, glycerol, pentaerythritol, hexanetriol, and branched polyester and polyether ester having trifunctional or higher hydroxyl groups obtained from dibasic acid with polyester polyol as the starting material and with the compound as the glycol component, as disclosed in JP-B-6-64726 (the term "JP-B" as used herein refers to an "examined Japanese patent publication"). Preferred hydroxyl groups are trifunctional groups, and tetrafunctional or higher groups are liable to cause gelation during reaction.

The examples of polyisocyanates that can be used in the invention include isocyanates, e.g., tolylene diisocyanate, 4,4'-diphenylmethane diisocyanate (MDI), hexamethylene diisocyanate, xylylene diisocyanate, naphthylene-1,5-diisocyanate, o-toluidine diisocyanate, isophorone diisocyanate and triphenylmethane triisocyanate; products of these isocyanates with polyalcohols; and polyisocyanates formed by condensation reaction of isocyanates.

The amount of binders for use in a magnetic layer and a nonmagnetic layer is from 5 to 50 weight %, preferably from 10 to 30 weight %, respectively based on the ferromagnetic powder and the nonmagnetic inorganic powder. When vinyl chloride resins are used, the amount thereof is from 5 to 30 weight %, when polyurethane resins are used, the amount thereof is from 2 to 20 weight %, and polyisocyanate is used in an amount of from 2 to 20 weight % in combination with these binders, however, for instance, when the corrosion of heads is caused by a slight amount of chlorine due to dechlorination, it is possible to use a combination of polyurethane and isocyanate alone.

In a magnetic tape, the amount of a binder, the amounts of vinyl chloride resin, polyurethane resin, polyisocyanate or other resins contained in the binder, the molecular weight of each resin constituting a magnetic layer, the amount of polar groups, or the physical characteristics of the above-described resins can of course be varied in a magnetic layer and a nonmagnetic layer according to necessity. These factors should be rather optimized in each layer. Well-known techniques with respect to multilayer magnetic layer can be used in the invention. For example, when the amount of a binder is varied in each layer, it is effective to increase the amount of the binder contained in a magnetic layer to thereby reduce scratches on the magnetic layer surface. For improving the head touch against a head, it is effective to increase the amount of the binder in a nonmagnetic layer to impart flexibility.

Ferromagnetic Powder:

As the ferromagnetic powders for use in a magnetic layer, ferromagnetic alloy powders mainly comprising α-Fe, magnetic iron oxide and hexagonal ferrite are used, but ferromagnetic alloy powders mainly comprising α-Fe are especially preferred. In the case of acicular powders, the average grain size of ferromagnetic powders is from 20 to 200 nm in long axis length, preferably from 30 to 150 nm, and more preferably from 30 to 100 nm. In the case of tabular grains, the tabular size is from 15 to 50 nm, preferably from 20 to 45 nm. These ferromagnetic powders may contain, in addition to the prescribed atoms, e.g., Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. Ferromagnetic powders containing at least one of Al, Si, Ca, Y, Ba, La, Nd, Co, Ni and B in addition to α-Fe are preferred, and those containing at least one of Co, Y and Al are more preferred.

A small amount of hydroxide or oxide may be contained in ferromagnetic alloy fine powders. Ferromagnetic alloy fine powders manufactured by well-known methods can be used, for example, the following methods are exemplified, e.g., a method of performing reduction with a composite organic acid salt (mainly oxalate) and reducing gas, e.g., hydrogen; a method of reducing an iron oxide with reducing gas, e.g., hydrogen, to thereby obtain Fe or Fe—Co grains; a method of heat-decomposing a metal carbonyl compound; a method of performing reduction by adding a reducing agent, e.g., sodium boron hydride, hypophosphite or hydrazine, to a ferromagnetic metal aqueous solution; and a method of evaporating a metal in low pressure inert gas to obtain fine powders. The thus-obtained ferromagnetic alloy powders are subjected to well known gradual oxidation treatment, e.g., a method of immersing the powders in an organic solvent and then drying; a method of immersing the powders in an organic solvent, charging an oxygen-containing gas to form oxide films on the surfaces of the powders, and then drying; and a method of forming oxide films on the surfaces of the powders by regulating partial pressure of oxygen gas and inert gas without using an organic solvent, and any of these methods can be used in the invention.

As the ferromagnetic powders for use in a magnetic layer, hexagonal ferrite powders can also be used. As the hexagonal ferrite powders, e.g., barium ferrite, strontium ferrite, lead ferrite, calcium ferrite, and the substitution products of these ferrites, e.g., Co substitution products are exemplified. Specifically, magnetoplumbite type barium ferrite and strontium ferrite, magnetoplumbite type ferrite having covered the particle surfaces with spinel, magnetoplumbite type barium ferrite and strontium ferrite partially containing a spinel phase are exemplified. The hexagonal ferrite powders may contain, in addition to the prescribed atoms, the following atoms, e.g., Al, Si, S, Sc, Ti, V, Cr, Cu, Y, Mo, Rh, Pd. Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, hexagonal ferrite powders containing the following elements can be used, e.g., Co—Ti, Co—Ti—Zr, Co—Ti—Zn, Ni—Ti—Zn, Nb—Zn—Co, Sb—Zn—Co and Nb—Zn.

It is preferred for a magnetic layer to contain nonmagnetic grains having an average grain size of 0.3 µm or less, preferably from 0.03 to 0.3 µm, and a Mohs' hardness of 6 or higher.

As such nonmagnetic grains, well known materials can be used alone or in combination, e.g., α-alumina having an α-conversion rate of 90% or more, β-alumina, silicon carbide, chromium oxide, cerium oxide, α-iron oxide, corundum, artificial diamond, silicon nitride, silicon carbide, titanium carbide, titanium oxide, silicon dioxide, and boron nitride are exemplified. The composites of these nonmagnetic grains (nonmagnetic grains obtained by surface-treatment with other nonmagnetic grains) may also be used. Compounds or elements other than their main components are often contained in these nonmagnetic grains, but the intended effects can be attained so long as the content of the main component is 90% or more. Nonmagnetic grains for use in the invention preferably have a tap density of from 0.3 to 2 g/ml, a moisture content of from 0.1 to 5 wt %, a pH value of from 2 to 11, and a specific surface area of from 1 to 30 m$^2$/g. The figure of nonmagnetic grains for use in the invention may be acicular, spherical or die-like figure, but a figure partly with edges are preferred for high abrasive property.

The specific examples of nonmagnetic grains for use in the invention include AKP-20, AKP-30, AKP-50 and HIT-50 (manufactured by Sumitomo Chemical Co., Ltd.), G5, G7 and S-1 (manufactured by Nippon Chemical Industrial Co., Ltd.), and TF-100, TF-140, 100ED and 140ED (manufactured by Toda Kogyo Corp.). Nonmagnetic grains for use in the invention can also be added to a nonmagnetic layer by changing the kind, amount and combination in addition to a magnetic layer. Nonmagnetic grains may be subjected to dispersion treatment with a binder before being added to a magnetic coating solution.

The addition amount of nonmagnetic grains is from 5 to 30 weight % based on the magnetic powder, preferably from 10 to 20 weight %.

It is preferred to fix the average grain size of nonmagnetic grains considering the magnetic layer thickness, by which protrusions having an optimal height can be formed on the surface of the magnetic layer and cleaning effect can be increased. For example, the average grain size of nonmagnetic grains is preferably in the range of from 50 to 200% of the magnetic layer thickness.

Nonmagnetic Layer:

Inorganic powders for use in a nonmagnetic layer are nonmagnetic powders and they can be selected from inorganic compounds, e.g., metallic oxide, metallic carbonate, metallic sulfate, metallic nitride, metallic carbide and metallic sulfide. By the addition of carbon blacks into a nonmagnetic layer, a desired micro Vickers' hardness can be obtained in addition to the well-known effects of reducing surface electrical resistance (Rs) and light transmittance. Further, it is also possible to obtain the effect of stocking a lubricant by the incorporation of carbon blacks into a lower layer. Furnace blacks for rubbers, thermal blacks for rubbers, carbon blacks for coloring, acetylene blacks, etc., can be used as carbon blacks. Carbon blacks used in a lower layer should optimize the characteristics as above by desired effects and sometimes more effects can be obtained by the combined use. If necessary, organic powders may be added to a nonmagnetic layer. With respect to lubricants, dispersants, additives, solvents, dispersing methods and others in a nonmagnetic layer, well-known techniques in magnetic layers can be used.

Additives:

As the additives for use in a magnetic layer and a nonmagnetic layer, additives having a head-polishing effect, a lubricating effect, an antistatic effect, a dispersing effect, and a plasticizing effect are used. Specifically, those disclosed in WO 98/35345 are exemplified.

As lubricants, for example, monobasic fatty acids having from 10 to 24 carbon atoms, metal salts thereof (e.g., with Li, Na, K or Cu), fatty acid monoester, fatty acid diester or fatty acid triester composed of a monobasic fatty acid having from 10 to 24 carbon atoms and any one of mono-, di-, tri-, tetra-, penta- and hexa-alcohols having from 2 to 12 carbon atoms, fatty acid ester of monoalkyl ether of alkylene oxide polymerized product, and fatty acid amide having from 8 to 22 carbon atoms can be used. These fatty acids and alcohols may contain an unsaturated bond or may be branched.

The specific examples of fatty acids include capric acid, caprylic acid, lauric acid, myristic acid, palmitic acid, stearic acid, behenic acid, oleic acid, elaidic acid, linoleic acid, linolenic acid and isostearic acid. The examples of esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleyl.

Backing Layer:

It is preferred that a carbon black and inorganic powder are contained in a backing layer. The prescriptions of binders and various additives used in a magnetic layer and a nonmagnetic layer are applied to a backing layer. The thickness of a backing layer is preferably from 0.1 to 1.0 µm, more preferably from 0.4 to 0.6 µm.

Support:

Supports for use in a magnetic tape are preferably nonmagnetic flexible supports, and conventionally well-known films, such as polyesters (e.g., polyethylene terephthalate and polyethylene naphthalate), polyolefins, cellulose triacetate, polycarbonate, aromatic or aliphatic polyamide, polyimide, polyamideimide, polysulfone, polyaramid, and benzoxazole can be used. A polyethylene terephthalate film and a polyimide film are preferably used. These supports may be previously subjected to corona discharge treatment, plasma treatment, adhesion assisting treatment, heat treatment, or dust removing treatment. These supports have an elastic modulus in the machine direction of from 3.5 to 20 GPa, an elastic modulus in the transverse direction of from 3.5 to 20 GPa, preferably an elastic modulus both in the machine direction and the transverse direction of from 4 to 15 GPa. As described above, the number of protrusions can be controlled in the prescribed range by increasing or decreasing the amount of fillers added to a support, and as fillers, e.g., $SiO_2$ and $CaCO_3$ are exemplified. The addition amount of fillers is from 0.1 to 3 weight % of the resins.

Manufacturing Method:

A magnetic layer and a nonmagnetic layer can be formed by preparing each coating solution by dissolving or dispersing the above components in a solvent and coating the coating solutions in sequence on a support (a web). Coating may be performed by any of a wet-on-wet method of coating a magnetic layer while a nonmagnetic layer is still wet, or a wet-on-dry method of coating a magnetic layer after a nonmagnetic layer is dried. A coated and dried web is arbitrarily subjected to orientation treatment, calendering treatment, and slitting.

EXAMPLES

The invention will be specifically described with reference to Examples and Comparative Examples, but the invention is not limited thereto.

Example 1

In the Examples, "parts" means "weight parts" unless otherwise indicated.

Manufacture of Cleaning Tape:

<Preparation of Coating Solution>

Composition of Upper Layer Coating Solution:

| | |
|---|---|
| Ferromagnetic metal powder | 100 parts |
| Coercive force (Hc): 191 kA/m (2,400 Oe) | |
| Specific surface area ($S_{BET}$): 62 $m^2$/g | |
| Crystallite size: 110 Å | |
| Saturation magnetization ($\sigma_s$): 117 A · $m^2$/kg | |
| Average long axis length: 45 nm | |
| Average acicular ratio: 5 | |
| pH: 9.3 | |
| Co/Fe: 25 atomic % | |
| Al/Fe: 7 atomic % | |
| Y/Fe: 12 atomic % | |
| Vinyl chloride copolymer | 10 parts |
| MR-100 (manufactured by Nippon Zeon Co., Ltd.) | |
| —$SO_3Na$ group content: $5 \times 10^{-6}$ eq/g | |
| Degree of polymerization: 350 | |
| Epoxy group (3.5 weight % as monomer unit) | |
| Polyester polyurethane resin | 10 parts |
| Neopentyl glycol/caprolactone polyol/MDI = 0.9/2.6/1 (by weight) | |
| —$SO_3Na$ group content: $1 \times 10^{-4}$ eq/g | |
| $\alpha$-$Al_2O_3$ | 10 parts |
| Average particle size: 0.2 μm | |
| Carbon black | 1 part |
| Average particle size: 0.10 μm | |
| Butyl stearate | 1.5 parts |
| Stearic acid | 0.5 parts |
| Methyl ethyl ketone | 150 parts |
| Cyclohexanone | 50 parts |
| Toluene | 40 parts |

Composition of Lower Layer Coating Solution:

| | |
|---|---|
| Nonmagnetic powder, acicular $\alpha$-iron oxide | 80 parts |
| Specific surface area ($S_{BET}$): 58 $m^2$/g | |
| Average long axis length: 0.15 μm | |
| Acicular ratio: 7.5 | |

-continued

| | |
|---|---|
| Carbon black | 20 parts |
| Average primary grain size: 16 nm | |
| DBP oil absorption amount: 80 ml/100 g | |
| pH: 8.0 | |
| Specific surface area ($S_{BET}$): 250 $m^2$/g | |
| Vinyl chloride copolymer | 12 parts |
| MR-100 (manufactured by Nippon Zeon Co., Ltd.) | |
| Polyester polyurethane resin | 5 parts |
| Neopentyl glycol/caprolactone polyol/MDI = 0.9/2.6/1 (by weight) | |
| —$SO_3Na$ group content: $1 \times 10^{-4}$ eq/g | |
| Butyl stearate | 1.06 parts |
| Stearic acid | 1.18 parts |
| Methyl ethyl ketone | 150 parts |
| Cyclohexanone | 50 parts |
| Toluene | 40 parts |

With each of the compositions for forming an upper layer coating solution and a lower layer coating solution, the components were kneaded in a continuous kneader and then dispersed in a sand mill. Polyisocyanate (Coronate L, manufactured by Nippon Polyurethane Co., Ltd.) was added in an amount of 5 parts to respective dispersions. Further, 40 parts of methyl ethyl ketone was added to the dispersions, and each of the dispersions was filtered through a filter having a pore diameter of 1 μm to thereby prepare coating solutions for forming an upper layer and a lower layer.

Composition of Backing Layer Coating Solution:

| | |
|---|---|
| Fine grain carbon black | 100 parts |
| Average particle size: 40 nm | |
| Coarse particle carbon black powder | 100 parts |
| Average particle size: 90 nm | |
| $\alpha$-Alumina (hard inorganic powder) | 5 parts |
| Average particle size: 200 nm | |
| Mohs' hardness: 9 | |
| Nitrocellulose resin | 90 parts |
| Polyurethane resin | 50 parts |
| Polyester resin | 5 parts |
| Dispersants: | |
| Copper oleate | 5 parts |
| Copper phthalocyanine | 5 parts |
| Barium sulfate (precipitating) | 5 parts |
| BF-1 (manufactured by Sakai Chemical Industry Co., Ltd.) | |
| Average particle size: 50 nm | |
| Mohs' hardness: 3 | |
| Methyl ethyl ketone | 800 parts |
| Toluene | 800 parts |

The above composition for forming a backing layer was kneaded in a continuous kneader and then dispersed in a sand mill. Polyisocyanate (Coronate L, manufactured by Nippon Polyurethane Co., Ltd.) in an amount of 40 parts and methyl ethyl ketone in an amount of 1,000 parts were added to the dispersion, and the dispersion was filtered through a filter having a pore diameter of 1 μm to thereby prepare a coating solution for forming a backing layer.

Manufacture of Cleaning Tape:

The obtained upper layer coating solution and lower layer coating solution were simultaneously coated by multilayer coating on polyethylene terephthalate (PET) support A (a thickness: 14.5 μm, a Young's modulus in the machine direction (MD): 500 kg/$mm^2$ (4.9 GPa), a Young's modulus in the transverse direction (TD): 500 kg/$mm^2$ (4.9 GPa), central line average surface roughness (Ra) of the upper layer coating side: 35 mm, (Ra) of the backing layer coating side: 36 nm) in a dry thickness of the upper layer of 0.1 μm and that of the lower layer of 1.4 μm. The coated upper layer solution was subjected to orientation while still wet with a cobalt magnet having a magnetic force of 300 mT and a solenoid having a magnetic force of 150 mT, and then drying to thereby form an upper layer.

A backing layer forming coating solution was coated after that on the other side of the support (the opposite side to the upper layer) in a dry thickness of 0.5 μm, and dried to form a backing layer. Thus, a roll for a cleaning tape having the upper layer on one side of the support and the backing layer on the other side was obtained. After heating treatment, the roll was further subjected to calendering treatment with a calendering processor consisting of a heating metal roll and an elastic roll comprising a thermosetting resin covering a core bar (temperature: 90° C., linear pressure: 300 kg/cm (294 kN/m)).

The roll was then subjected to heating treatment at 50° C. for 48 hours, and then slit to ½ inch in width to form a cleaning tape.

Example 2

A cleaning tape was manufactured by the same procedure as in Example 1 except that support B obtained by increasing the amount of the filler in support A to increase the number of protrusions was used.

Example 3

A cleaning tape was manufactured by the same procedure as in Example 1 except that support C obtained by decreasing the amount of the filler in support A to decrease the number of protrusions was used.

Comparative Example 1

A cleaning tape was manufactured by the same procedure as in Example 2 except for changing the calendering treatment.

Comparative Example 2

A cleaning tape was manufactured by the same procedure as in Example 1 except for using support D in place of support A.

Supports A to D used in Examples and Comparative Example are shown in Table 1 below.

TABLE 1

Ra and number of protrusions having a height of 25 nm or more at cleaning layer side (coating layer side) of support

| Support | Ra (nm) | Number of Protrusions Having a Height of 25 nm or more (number/$10^5$ μm$^2$) |
|---|---|---|
| Support A | 35 | 2,500 |
| Support B | 37 | 6,500 |
| Support C | 32 | 700 |
| Support D | 10 | 200 |

A cleaning tape cartridge was prepared with each of the above cleaning tape as follows.

Manufacture of Cleaning Tape Cartridge:

Three hundred (300) meters of the obtained cleaning tape having a width of ½ in. was wound in Ultrium-2 cartridge C.

Each sample was evaluated as follows, and the results obtained are shown in Table 2 below.

<Evaluating Method>

Evaluation of Cleaning Tape Cartridge:

The cleaning tape cartridges obtained were evaluated according to the following measuring conditions.

(1) Cleaning Power

Ultrium-2 magnetic tape cartridge A (manufactured by Fuji Photo Film Co., Ltd.) was set on Ultrium-2 drive (manufactured by IBM Corporation) having an MR head. A signal of recording wavelength of 0.4 μm was recorded and reproduced, and the reproduction output at that time was measured by 0 ch and 7 ch (the highest part and the lowest part of the head module) (initial output). After that, cartridge B for generating dirt on the head was made a round trip to generate dirt, and the used Ultrium-2 magnetic tape cartridge A was reproduced and the output was measured (the output before cleaning).

In the next place, cleaning tape cartridge C of the invention was made a round trip, and then cartridge A was reproduced and the output was measured (the output after cleaning). The ratio of the initial output and the output after cleaning (in terms of dB) was taken as cleaning power (0 dB is ideal and −1 dB or more is allowable).

<Manufacturing Method of Cartridge B for Generating Dirt on Head>

A magnetic tape cartridge was manufactured by preparing the above cleaning tape-forming compositions in which the abrasive was not added to the magnetic layer coating solution, and the magnetic layer, nonmagnetic layer and backing layer were coated on a PEN support having Ra of 5 nm and a thickness of 6.8 μm, subjected to calendering treatment similarly to the above and cutting, and wound in Ultrium-2 cartridge in length of 609 m.

(2) Head Abrasion

The cleaning tape was run at 23° C. 70% RH for 10 minutes by using Ultrium-2 drive (manufactured by IBM Corporation), the height of the MR head before and after running was measured with AFM, thus the head abrasion was computed (50 nm/10 minutes is allowable).

TABLE 2

| | | Upper layer | | | |
|---|---|---|---|---|---|
| Example No. | Support | Ra (nm) | Number of Protrusions Having a Height of 25 nm or more (number/$10^5$ μm$^2$) | Head Cleaning Power Output (dB) | Abrasion of Head (μm/10 min) |
| Example 1 | A | 13 | 230 | −0.1 | 0.01 |
| Example 2 | B | 14 | 1,500 | 0.0 | 0.03 |
| Example 3 | C | 11 | 70 | −0.2 | 0.01 |
| Comparative Example 1 | A | 17 | 2,600 | 0 | 1.0 |
| Comparative Example 2 | D | 7 | 20 | −2.0 | 0.003 |

It can be seen that cleaning tapes in Examples 1 to 3 are capable of exhibiting excellent cleaning power in a short period of time and head abrasion is also sufficiently small.

Contrary to this, the cleaning tape in Comparative Example 1 has protrusions more than the prescribed range in the invention, so that head abrasion increases. Further, it can be seen that the cleaning power of the cleaning tape in Comparative Example 2 is extremely deteriorated.

This application is based on Japanese Patent application JP 2004-288215, filed Sep. 30, 2004, the entire content of which is hereby incorporated by reference, the same as if set forth at length.

What is claimed is:

1. A cleaning tape comprising a support and a coating layer containing powder and a binder, wherein a surface of the coating layer has a central line average roughness of from 10 to 20 nm and has protrusions having height of 25 nm or more in number of from 60 to $1,700/10^5$ $\mu m^2$, the surface of the coating layer being a surface of the cleaning tape.

2. The cleaning tape according to claim 1, wherein the coating layer comprises a nonmagnetic layer and a magnetic layer so that the support, the nonmagnetic layer and the magnetic layer are provided in this order.

3. The cleaning tape according to claim 2, further comprising a backing layer so that the backing layer, the support, the nonmagnetic layer and the magnetic layer are provided in this order, wherein the nonmagnetic layer contains nonmagnetic inorganic powder and a binder, the magnetic layer contains ferromagnetic powder and a binder and the backing contains a carbon black and inorganic powder.

4. The cleaning tape according to claim 1, wherein the surface of the coating layer has a central line average roughness of from 12 to 18 nm.

5. The cleaning tape according to claim 1, wherein the surface of the coating layer has protrusions having height of 25 nm or more in number of from 100 to $1,600/10^5$ $\mu m^2$.

6. The cleaning tape according to claim 1, wherein the surface of the coating layer has protrusions having height of 25 nm or more in number of from 500 to $1,500/10^5$ $\mu m^2$.

7. The cleaning tape according to claim 1, wherein the support is a nonmagnetic flexible support.

8. The cleaning tape according to claim 1, wherein the support comprises polyethylene terephthalate or polyimide.

* * * * *